United States Patent [19]

Hardin

[11] Patent Number: 4,696,492

[45] Date of Patent: Sep. 29, 1987

[54] SOUNDWRITING—A PHONETIC SCRIPT WITH KEYBOARD

[76] Inventor: Evelyn L. Hardin, 1625 28th Ave., Meridian, Miss. 39301

[21] Appl. No.: 749,414

[22] Filed: Jun. 27, 1985

[51] Int. Cl.4 ............................................. B42D 15/00
[52] U.S. Cl. .................................... 283/45; 283/1 R; 283/46
[58] Field of Search ........................... 283/1 R, 45, 46

[56] References Cited

U.S. PATENT DOCUMENTS

| | | | |
|---|---|---|---|
| 78,296 | 5/1868 | Leigh | 283/46 |
| 198,507 | 12/1877 | Dawson | 283/46 |
| 395,120 | 12/1888 | Campbell | 283/46 |
| 3,407,515 | 10/1968 | Pitman | 283/46 X |
| 3,426,451 | 2/1969 | Hoffmann | 283/46 X |
| 3,709,525 | 1/1973 | Frank | 283/1 R |

FOREIGN PATENT DOCUMENTS 537798  5/1922  France ................................... 283/46

Primary Examiner—Paul A. Bell
Attorney, Agent, or Firm—Harrington A. Lackey

[57] ABSTRACT

A phonetic alphabet in script form called soundwriting was first adapted to English with thirty-seven letters, each representing a separate speech sound. The script uses no silent letters or other learning blocks. Spelling is made regular using soundwriting. It is adapted to a keyboard.

By adding additional letters to represent new sounds the script has been expanded to include sounds of French, Spanish, Italian and German with only forty-six symbols. The spelling of these languages in soundwriting is also completely phonetic which eliminates spelling difficulties in these languages. New letters to expand soundwriting are on the keyboard. A temporary letter is used when adapting a new language to soundwriting until a permanent letter is designed for it and placed on the keyboard. Soundwriting provides a simpler and easier way of learning the vocabularies of languages to which it is adapted.

3 Claims, 7 Drawing Figures

FIG-1A
SOUNDWRITING/KEYBOARD

| LETTER NUMBER | ROMAN LETTER | AS IN WORD | SOUNDWRITING LETTER | KEYBOARD LINE (LINE-SPACE) |
|---|---|---|---|---|
| 1 | A | AIM | | 2-3 |
| 2 | A | AND | | 3-3 |
| 3 | A | ARE | | 3-1 |
| 4 | A | ALL | | 4-3 |
| 5 | B | BE | | 4-9 |
| 6 | C | CAN | | 2-8 |
| 7 | CH | CHICKEN | | 3-6-U |
| 8 | D | DAY | | 3-8 |
| 9 | E | EACH | | 2-5 |
| 10 | E | EVERY | | 3-5 |
| 11 | ER | LETTER/HUM | | 4-4 |
| 12 | ER | TERM/URGE | | 4-1 |
| 13 | F | FOR | | 4-8 |
| 14 | G | GO | | 4-5 |
| 15 | H | HOW | | 2-9 |
| 16 | I | IDEA | | 2-4 |
| 17 | I | IT | | 3-4 |
| 18 | J | JUST | | 3-5-U |
| — | K | — | NO LETTER, USE "C" | — |

FIG-1B
SOUNDWRITING/KEYBOARD

| LETTER NUMBER | ROMAN LETTER | AS IN WORD | SOUNDWRITING LETTER | KEYBOARD LINE (LINE-SPACE) |
|---|---|---|---|---|
| 19 | L | LET | ℓ | 3-9 |
| 20 | M | ME | ∩ | 2-6 |
| 21 | N | NO | m | 3-6 |
| 22 | NG | KING | ⌀ | 4-5-U |
| 23 | O | OWE | O | 2-2 |
| 24 | OO | TOO | O | 3-2 |
| 25 | OO | LOOK | Ⓞ | 4-2 |
| 26 | P | PAGE | | 3-7-U |
| 27 | R | ROOF | h | 4-6 |
| 28 | S | SO | ʃ | 3-10 |
| 29 | SH | SHE | ʃ | 2-10 |
| 30 | T | TO | l | 3-7 |
| 31 | TH | THE | 1 | 2-7 |
| 32 | TH | THIN | ʃ | 2-7-U |
| 33 | U | YOU | U | 2-1 |
| 34 | V | VERY | ʋ | 3-4-U |
| 35 | W | WE | ◡ | 4-7 |
| 36 | Z | ZOO | ʔ | 3-11 |
| 37 | ZH | MEASURE | ʃ | 4-6-U |

FIG-3

10
YOU AND I WILL GO TO THE PARK TOMORROW. (28 LETTERS)

12
(23 LETTERS)

15
(12 LETTERS)

HOW ARE YOU TODAY? I'M FINE, THANK YOU.

I'LL GO HOME TUESDAY. PLEASE COME TO SEE ME.

FIG-4

| LETTER NUMBER | LANGUAGE | AS IN WORD | NEW LETTER | SAMPLE WORD | HOW SOUND IS MADE |
|---|---|---|---|---|---|
| 38. | F. | T<u>U</u> (THOU) | | | WHILE ROUNDING LIPS FOR *o* AND TONGUE ON LOWER TEETH SAY ___. |
| | G. | ÜBER (ABOVE) | | | SAME AS ABOVE. |
| 39. | F. | F<u>EU</u> (FIRE) | | | WHILE ROUNDING LIPS FOR *o* AND TONGUE AGAINST LOWER TEETH SAY ___. |
| | G. | K<u>Ö</u>NIG (KING) | | | SAME AS ABOVE. |
| 40. | S. | CA<u>R</u>O (EXPENSIVE) | | | LIGHTLY TRILLED, ONE TIP. |
| | I. | <u>R</u>OSO (RED) | | | SAME AS ABOVE. |
| 41. | S. | CA<u>RR</u>O (CAR) | | | STRONGLY TRILLED. |
| | I. | CHITA<u>RR</u>O (GUITAR) | | | SAME AS ABOVE. |
| 42. | F. | PA<u>R</u>IS (PARIS) | | | LIGHTLY TRILLED, THROATY, ALMOST A GARGLE. |
| 43. | F. | <u>R</u>ICHE (RICH) | | | STRONGLY TRILLED, LIKE A GARGLE. |

| NEW SYMBOL | AS IN WORD | | HOW MADE |
|---|---|---|---|
| 44. NASAL | (F) BO<u>N</u> (GOOD) | | PLACE SYMBOL IN FRONT OF LETTER TO BE NASALIZED. |
| 45. GUTTURAL | (G) A<u>CH</u> (AH) | | WRITE IN FRONT OF LETTER TO BE GUTTURALIZED. |
| 46. TEMPORARY LETTER | | | USE FOR ANY NEW SPEECH SOUND UNTIL A PERMANENT LETTER IS DESIGNED. |

FIG-6
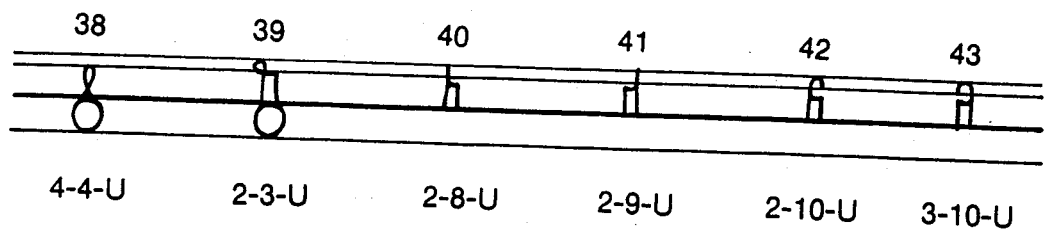
4-4-U  2-3-U  2-8-U  2-9-U  2-10-U  3-10-U
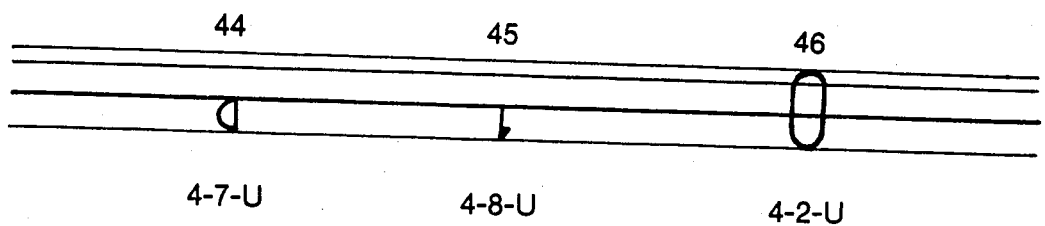
4-7-U  4-8-U  4-2-U

SOUNDWRITING—A PHONETIC SCRIPT WITH KEYBOARD

The invention is a new phonetic alphabet in script form for handwriting but also adapted to a keyboard for machine production.

Each letter represents a single sound without duplication, which removes spelling difficulties.

BACKGROUND OF THE INVENTION

Difficulties of Using the Roman Alphabet With English

The main difficulty of using the Roman Alphabet with English is that it is only semi-phonetic. English has more speech sounds than letters to express them. Several adjustments which have been made are insufficient to solve the problems. For example two letters, each of which express their own separate sound are used together to express a third sound; for example "sh" as in "she".

There are many silent letters used in traditionally written English which not only confuse but use up energy and space in writing or typing. There are misleading letters such as the combination "ph" for the sound "f" in "phone". There are duplicates of letters, already in the alphabet expressed by another letter or letter combination.

There are numerous double letters where only one of the letters is actually expressed.

In addition, some letters express more than one sound, especially vowels. For example the letter "e" uses one sound for "e" in "every" and another for the "e" in "each". The letter "a" is used for "aim", "am", "father" and "all".

Consider the confusion the simple word "cat" could bring to a child learning to read. The "c" is often used as in the word "city" to represent the sound of "s", but also to represent "k" as in "cup". So the word "cat" has two variables for the letter "c" or even more, and the "a" has at least four variables, total six sounds from which the beginner must choose.

Frequently Roman letters vary their pronunciations of the same letter. An example of this is in the use of "o" in the following words: "comb", "come", "comet", "cork".

Is there any wonder that children of English speaking background take longer to learn to read than some of the children of Europe?

The Roman Script

The Roman script itself needs improvement. Though some letters are simple enough in shape to be made with few motions, some require too many motions. People are continually annoyed by having to lift the pen from the paper to cross the "t" or dot the "i".

Results of Using the Roman Alphabet for English

Some children find it difficult to learn the basic tools of education, writing and reading, because of the faults of the Roman alphabet. It has been found that slow learners only learn with a phonetic approach to reading.

Failing to learn to read in the first grade, the student's frustration increases in further grades and may become a constant feeling of defeat, spreading to other areas of life. Usually such a student either learns to cover up and becomes a semi-literate or drops out of school. In both cases possibilities for future education to prepare for the better jobs are closed to them, while jobs become increasingly more difficult to obtain without sufficient education. In United States jails, the majority of inmates lack a high school education.

Additional Languages

English is not the only language using the Roman Alphabet. There are some languages with fewer inconsistencies than English, but those using the Roman Alphabet do not express all the different pronunciations of vowels represented by these letters. All languages would benefit if they were provided with a completely phonetic alphabet.

The International Phonetic Alphabet

The International Phonetic Alphabet (IPA) was designed and is used by linguist for various languages. Because it is far from simple, it lacks acceptance among students. One high school teacher said her students mostly refused to learn it. One college student said writing with it was like using Old English letters. There is a need for a simpler international phonetic alphabet.

DESCRIPTION OF THE INVENTION

The invention is a phonetic alphabet in script form called soundwriting. Each soundwriting letter expresses a single speech sound. We can think of writing down the sound, using the soundwriting letters which represent each sound in its turn in a word. If one can pronounce a word it can be written down in soundwriting. If one meets up with an unfamiliar soundwritten word, he or she can sound out the letters and read the word.

Soundwriting was first developed with English which requires thirty-seven letters: four letters were omitted and fifteen new ones added. It is adapted to a keyboard.

An advantage is that there are no silent letters or misleading letters in soundwriting. Also no duplicate or double letters not pronounced.

If there is any doubt about whether letters should be double or not, omit the second letter. An example of a word requiring double letters is "unnecessary".

A most important advantage of soundwriting is that with practice using the phonetic script, spelling worries are over and writing becomes automatic.

Still another advantage of soundwriting is that it was designed to be easy to learn by leaving memory links to tie-in with things already learned. Related sounds have related shapes of letters which is a memory reinforcement. All four of the "A" family of letters have the basic wedge shape of the Roman letter "A" without the center cross line.

No capital letters are used in soundwriting, rather material to be capitalized is underscored. If capital letters were used it would require twice the number of letters to be learned and twice as many keyboard positions.

One change is made in punctuation of soundwriting; a period is not used to end a sentence. Rather use two diagonals like this: //. Periods can easily become lost; also without capitalized letters to begin a sentence, the diagonals are needed.

Script

Writing will always be needed, so a script is used. Additional advantages of the script are that it is designed to be more legible, "flowing", with simpler letters requiring few motions.

Although soundwriting has more letters, fewer letters are normally needed, because of omission of silent and double letters. Often a five letter word can be reduced to three.

SOUNDWRITING EXPANDED

The soundwriting alphabet has new letters for French, Spanish, German and Italian, not used in English. These letters are in the keyboard plan. These languages also use the Roman Alphabet but do not always pronounce the letters the same way in different languages. This is a hindrance in learning these languages, but the soundwriting alphabet has the advantage that pronunciations of letters is the same for the various languages, an aid to learning vocabularies. Diacritical marks to change pronunciation are confusing and are not used in soundwriting.

Soundwriting for additional languages is completely phonetic, which gives the advantage for each of these languages to overcome traditional hazards in spelling, with a single symbol to represent each speech sound of whatever language it is being used. Soundwriting expanded has the unique advantage of representing sounds of foreign words as they are spoken.

A symbol for a nasal placed in front of any soundwritten letter, indicates that letter is to be pronounced as a nasal; the letter for a guttural is used in the same manner.

One should first learn soundwriting in their native tongue; then in learning a new language. One can concentrate on the new sounds for which there are new letters. This will enable one to record the spoken sounds of that language. However, if one wants to read and write in the traditional Roman Alphabet, additional classes will be needed for that purpose. One is amazed at the very few new letters required to make these languages phonetic, used in addition to the new letters for English already in the soundwriting script.

There is a temporary letter provided to be used when an adept at soundwriting is learning a new language and discovers a new sound. This temporary letter is used until a new letter is designed to be used exclusively for this sound, in whatever language it is located. Unwritten languages also can be adapted to soundwriting.

The Keyboard

All letters for the phonetic alphabet of English and also French, Spanish, Italian and German are on the keyboard with some spaces reserved for letters of additional languages to be adapted to the expanded soundwriting alphabet. The keyboard includes the nasal, guttural and temporary letter. Before this invention, there was no simple and easy way to type phonetically and in several different languages.

All keys are arranged for the convenience and ease of typing. More information will be given in the description of FIG. 5.

BRIEF DESCRIPTION OF THE DRAWINGS

FIGS. 1A and 1B illustrate the soundwriting script for English of the present invention and compare the Roman Letter Alphabet with the soundwriting script.

FIG. 3 shows English sentences using the Roman Alphabet compared to the same sentences written in the soundwriting script, and also in using soundwriting with abbreviations.

FIG. 4 illustrates additional new letters and symbols of the soundwriting script not used in English but which are used for the conversion of certain foreign languages into the soundwriting script.

FIG. 6 illustrates the soundwriting symbols of FIG. 4 to indicate size of letters and position above and below the guideline, also keyboard position of new letters of FIG. 4.

DESCRIPTION OF THE PREFERRED EMBODIMENTS

Figure 2:
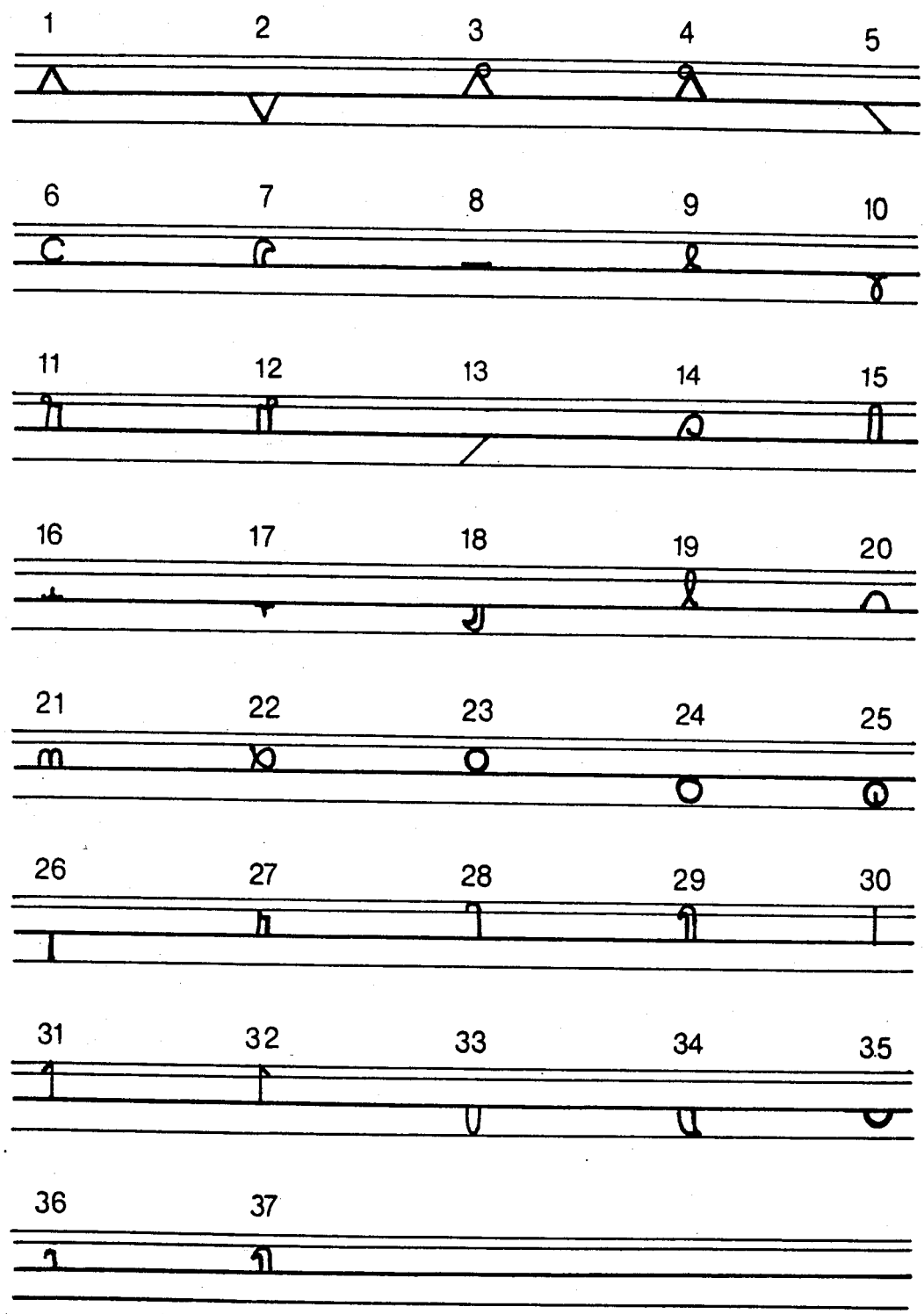
FIG. 2 shows the soundwriting script drawn horizontally, in order to show the size and shape of letters in relation to each other.

FIGS. 1A and 1B illustrate the presently preferred font of symbols and the corresponding Roman letter or letters. Column 1 contains the number of the soundwriting letter. Column 2 contains the Roman letter or letters which appear in Column 3. Column 3 gives a word within the Roman letters containing the sound of the soundwriting letter of Column 4. Column 5 gives the keyboard position of the soundwriting letter of Column 4. As set forth in FIGS. 1A and 1B, a total of thirty-seven symbols represent all the sounds produced in the English language. Each symbol expresses one and only one sound. Thus, once the symbols and their corresponding sounds are mastered, the student of the English language will be able to spell any English word in the soundwriting script.

Because each symbol in the soundwriting script represents one and only one sound, duplicate letters have been eliminated. As will be noted, the duplicated Roman alphabet letters "k", "q", "x" and "y" have been discarded. For example, "k" which has the same sound as "c" in the word "cup" has been omitted, and the symbol for the sound produced by the letter "k" uses "c" in its place. Further, since it takes more effort to write the letter "k" than the letter "c", the shape of the letter "c" has been retained in the soundwriting script.

Also note that the Roman letter "a" which is used to represent four different sounds has been replaced by four soundwriting symbols, Soundwriting letters have been reduced to their simplest form in order to have the advantage of saving time and effort in writing and also to make the script easier to visualize. The script is adapted for faster reading and writing with less effort.

In order to provide a consistent spelling, all silent letters are omitted when the words are reproduced in the soundwriting script, likewise for double letters not pronounced one is omitted when a word is reproduced in the soundwriting script. Roman Alphabet letter combinations which produce a third sound, for example, "ch", "sh" and "th", are each provided with a separate symbol to prevent confusion.

Soundwriting does not dictate the pronunciation of words. Rather, it provides a means of expressing the sounds of words. It can even be used to express dialects of the same language. For instance, soundwriting symbol number 11 on FIG. 1A illustrates how the "er" in "letter" would be pronounced by a resident of the Southern United States which is like the "u" in "hum". A person who spoke a dialect in which the "r" was emphasized would pronounce the "er" in "letter" as the "er" is pronounced in "term". The soundwriting symbol for the latter "er" sound is symbol number 12 on FIG. 1A.

The soundwriting script does not include capitalization. Instead of capital letters, capitalization is expressed by the symbols being underscored. Undoubtedly new typewriters and other means of reproducing the script will devise improved methods of underscoring letters in a way to save time and effort. Also, two diagonals (//) are used instead of using a period (.) to end a sentence.

FIG. 2 illustrates the font of symbols of the soundwriting script of FIG. 1. In FIG. 2, three parallel lines are placed, two above and one below the central guideline, which is the heavier line, in order to show the relative size of the symbols. The line below the central guideline and the first line above the central guideline are equally distant from the central guideline. The scaled lines are for learning the position of the letters and for practice, but are not used generally. Just as traditionally English has an imaginary guideline, and only a few letters have a part below it, soundwriting has more letters below the guideline. Soundwriting can be used with either lined or unlined paper as suitable.

FIG. 3 illustrates a comparision of an English sentence (10) using the Roman Alphabet and the same sentence (12) reproduced in the soundwriting script. As can be seen, the Roman Alphabet sentence (10) comprises twenty-eight letters while the soundwriting script sentence (12) comprises only twenty-three letters. Fewer letters are needed to express an English sentence in the soundwriting script due to the fact that each soundwriting script symbol indicates a speech sound while the Roman Alphabet sentence (10) has excess silent letters. For example, the Roman letters of the word "you" produces only one sound and therefore is illustrated by one symbol in the soundwriting script. The soundwriting script may be abbreviated even further as illustrated in the third sentence (15). Additional sentences are similarly illustrated in FIG. 3.

FIG. 3 also shows the soundwriting script symbols connected as they would normally be in handwritten material. In all other charts, the soundwriting symbols are drawn as separate symbols. It is intended, however, that even typing and printing fonts of soundwriting script have more or less connected letters since connected letters are an aid to word recognition.

In FIG. 4 the soundwriting script is extended by a few additions of new letters to represent French, Spanish, Italian and German. In FIG. 4, the numbers assigned to the soundwriting symbols are noted in Column 1, the name of the language in abbreviated form is given in Column 2 (F=French, G=German, S=Spanish, I=Italian). A sample word of that language using the sound is given in Column 3 (English translation of the word is given in parenthesis), the new soundwriting symbol corresponding to the sound in the example word in Column 3 is shown in Column 4, the sample foreign language word using the new soundwriting letter is shown in Column 5, and the manner in which the sound is made is explained in Column 6. As will be noted, a symbol for a nasal sound is on FIGS. 4 and 6; also for a guttural. When either symbol is placed in front of a soundwriting letter, it indicates that letter is to be pronounced in that manner. These with the temporary letter, bring the number of soundwriting symbols to forty-six.

Soundwriting avoids the use of diacritical marks to change the pronunciation of letters in a word. Instead, a new letter is used. However, a teacher may use a mark to indicate stress, but this is for temporary use only.

When a new sound is found in a language being adapted to soundwriting, it is first given the temporary letter; or if more than one new sound is found a number is written inside the letter. Then the never to be duplicated permanent letter is assigned for each new sound and the new letters placed on the keyboard.

Figure 5:
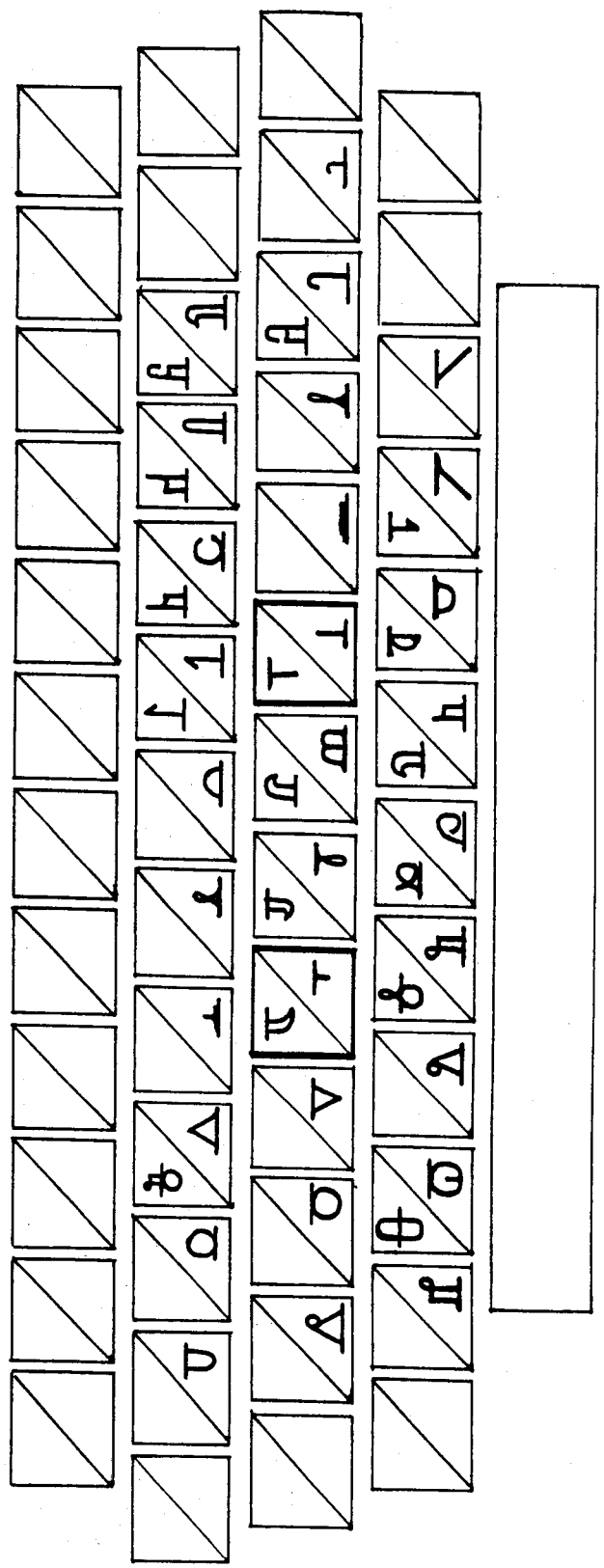
FIG. 5 illustrates a keyboard for producing the soundwriting script of FIGS. 1A, 1B and 4.

FIG. 5 illustrates a keyboard for typing the soundwriting script symbols for English, French, Spanish, Italian and German. The keyboard positions of the soundwriting symbols are indicated in FIGS. 1A, 1B, Column 5 and FIG. 6.

Keyboard positions are numbered: begin at the upper left-hand corner with the letter "u". It is on Row 2, the first letter, and occupies that row, and is numbered 2-1. Rows are numbered from the top down, and the key on that line, beginning with those marked, is from left to right. If the letter "u" is added to the number, it means that key is for the upper shift position.

The "home" position for the forefingers is noted on FIG. 5 by being outlined by the use of a darker border for these keys, If the forefingers are put on these keys, then the other fingers will be in their right places, leaving the thumb for using the space bar.

Some keys which are left vacant may be needed in the future for new soundwriting letters.

The keyboard includes a plurality of keys which include the soundwriting symbols. Also included on the keyboard is a plurality of keys which include punctuation, numerals and other functions such as margins and tabs. As noted above, the soundwriting script does not include capital letters, instead, capitalization is denoted by a symbol being underscored. Therefore, the upper and lower case of the keyboard may function to provide separate symbols.

While some keys which are illustrated in FIG. 5 only contain a single symbol, they may be expanded to contain two symbols, one in lower case position and one in the upper case position. The keyboard may therefore be expanded to produce a soundwriting script for expressing the vocabulary of a plurality of languages.

The keys are arranged so that the majority of vowel sounds are located on the left hand side of the keyboard and the majority of consonent sounds are located on the right. Letters for the most frequently used sounds are located in the center of the keyboard to be actuated by the forefingers, the strongest fingers. Keys are arranged so that they provide a more convenient and useful keyboard.

Of course, while a conventional typewriter keyboard is illustrated in FIG. 5, the keyboard may be adapted for use with typesetting machines, computers and the like.

It should be understood that various changes and modifications to the preferred embodiment described herein will be apparent.to those skilled in the art. Such changes and modifications can be made without departing from the spirit and scope of the present invention and without diminishing its attendant advantages. It is therefore intended that such changes and modifications be covered by the claims.

FIG. 6 shows new letters and symbols for expanded soundwriting, scaled as FIG. 2, to show the position and size of letters as compared to other soundwriting letters. It gives numbers of the letters and positions on the keyboard.

BEST USE OF INVENTION

Learning and Teaching Languages

For an English speaker who has been using a semi-phonetic alphabet all his/her life, the Soundwriting-English Lesson-Workbook has been prepared and will soon be published. The alphabet itself is easy to learn, but what may require effort is training the habits using the Lesson-Workbook. The pupil learns to think phonetically by crossing out silent letters. Letters of simple shapes are kept, and they are used in the first lesson. Gradually new letters are introduced. The student immediately begins using the new script. Abbreviations are also introduced and practiced.

The seven lessons require about an hour each. After this the student is asked to practice on his own for a half-hour a day for a month, writing and reading soundwriting.

By this time the student usually will have established in his habits the use of the soundwriting alphabet. Practice brings an automatic response with no hesitation or losing the trend of thought in considering the right spelling of a word.

Teaching Children

Some suggestions for teaching children of any language background are given in the introduction to the English-Soundwriting Lesson-Workbook soon to be published.

It is important that children beginning school learn with joy and enthusiasm for then there will be continued interest; otherwise there will be lagging efforts and the child will fall behind in studies. Games of many kinds to teach phonetic values will be useful to keep the interest of the children.

From reports of experiments in England using several different types of simplified spelling, test results were favorable. Some pupils could only learn by a phonetic approach. Others learned much faster than those using the traditional spelling, even though studying for a shorter period of time. Teachers of these students were pleased with results. One advantage reported was that a wider vocabulary could be used with a phonetic approach, allowing more interesting reading which held the attention of the children.

It was important in these tests to give the phonetic approach before integrating these students with the traditional teaching of English with the Roman alphabet so that pupils would have the joy of success first, before meeting up with the inconsistencies of spelling of English.

These results with simplified spelling hold promise of even better results with a completely phonetic spelling being taught.

Learning New Languages

For each new language adapted to soundwriting there will be charts made and a lesson workbook. When one who knows soundwriting wishes to learn an additional language if the lesson book has been printed, a soundwriting teacher of that language should be located.

If the lesson book is not ready, the soundwriter locates a proficient speaker of the desired language, and takes down in soundwriting what is said as the speaker points out objects, possibly articles of clothing, furniture, etc. This method has been further developed with pictures, and techniques to indicate verbs, adjectives, etc. The soundwriter can make a listing of all words learned and file in a card index for compiling words for a soundwriting dictionary in that language.

Learning a language without using another language for translation has a lasting advantage, in that it trains the student to learn to think in the new language being learned. Otherwise the student will continue to think first in the language used for translation. This method may seem to go slowly at first, but becomes faster later.

The soundwriter uses the temporary letter until a permanent letter is designed for each sound and placed on the keyboard,

Unwritten Languages

Unwritten languages can be taken down in the manner described above. Without a means of writing for review, it would be difficult to learn such a language; but the alphabet used should not only be phonetic, but very simple in order to have a time interval for writing it. It would be close to impossible to take down in writing unless with a phonetic script simple enough to be written quickly.

When permanent letters are designed for unwritten languages and books printed, the door to literacy and education is open.

SUMMARY OF ADVANTAGES OF SOUNDWRITING

1. Soundwriting provides an alternate alphabet to the Roman Alphabet by having one and only one letter to represent each speech sound of English, also French, Spanish, Italian, and German.

2. It has a means of adapting additional languages to this alphabet, including previously unwritten languages.

3. It is provided with a script form of writing which is simple, flowing and legible.

4. It is provided with a keyboard using the same letters as the script.

5. Being phonetic, soundwriting does not use silent, misleading or duplicate letters, double letters not pronounced, diacritical marks, and omits other learning blocks for languages.

6. Using soundwriting without spelling difficulties speeds up writing which becomes automatic with practice.

7. Using soundwriting, writing, reading and typing are faster and require less effort.

8. Soundwriting letters are pronounced the same in any language, an aid to learning languages.

9. Soundwriting for English is made even shorter by using abbreviations for the most used words.

10. Soundwriting was designed to be easy to learn and remember; memory ties are left in soundwriting; some of the simpler Roman script letters. Similar sounds are represented by similar shapes; these provide memory reinforcement.

11. Tests results in England of school children beginning to learn to read with various kinds of simplified spelling were favorable. With a completely phonetic alphabet, prospects of children learning to read would undoubtedly be even more favorable. Children who would have had a difficult time learning to read with the Roman alphabet would probably find they could learn with a phonetic alphabet. Faster learners would probably be able to advance a year or two ahead of what their achievment level would have been using the traditional Roman Alphabet. Time saved in learning the basic educational tool, reading, could be profitably used in study of various additional topics.

I claim:

1. A font of characters as shown in FIG. 5.
2. The invention according to claim 1 in which each said character shown in FIGS. 1-A and 1-B has the corresponding sound indicated in FIGS. 1-A and 1-B.
3. The invention according to claim 1 in which each said character shown in FIG. 4 has the corresponding sound indicated in FIG. 4.

* * * * *